United States Patent
Marlowe

(10) Patent No.: US 6,261,491 B1
(45) Date of Patent: Jul. 17, 2001

(54) METHOD FOR PRODUCING AND CONDITIONING BLOCKS OF FLEXIBLE POLYURETHANE FOAM

(75) Inventor: Delane Marlowe, Mooresville, NC (US)

(73) Assignee: TAS Enterprises, L.L.C., Mooresville, NC (US)

(*) Notice: Subject to any disclaimer, the term of this patent is extended or adjusted under 35 U.S.C. 154(b) by 0 days.

(21) Appl. No.: 09/472,751

(22) Filed: Dec. 28, 1999

Related U.S. Application Data

(62) Division of application No. 09/110,361, filed on Jul. 6, 1998, now Pat. No. 6,022,205.

(51) Int. Cl.[7] .................................................. B29C 71/00
(52) U.S. Cl. ........................ 264/51; 264/48; 264/102; 264/232; 264/344
(58) Field of Search .......................... 264/48, 344, 102, 264/232, 51

(56) References Cited

U.S. PATENT DOCUMENTS

| | | | |
|---|---|---|---|
| 3,890,414 | * | 6/1975 | Ricciardi et al. ...................... 264/48 |
| 4,051,211 | * | 9/1977 | Beser et al. ............................ 264/51 |
| 4,743,419 | * | 5/1988 | Bierschenk ............................ 425/73 |
| 4,955,800 | * | 9/1990 | Rothwell et al. ................. 425/817 R |
| 4,988,271 | * | 1/1991 | Kumasaka et al. ..................... 425/73 |
| 5,059,376 | * | 10/1991 | Pontiff et al. .......................... 264/234 |
| 5,128,379 | * | 7/1992 | Stone ..................................... 521/50 |
| 5,171,756 | * | 12/1992 | Ricciardi et al. ....................... 521/55 |
| 5,188,792 | * | 2/1993 | Drye et al. ............................. 264/232 |
| 5,275,544 | * | 1/1994 | Marlowe ........................... 425/817 R |
| 5,401,448 | * | 3/1995 | Ricciardi et al. ..................... 264/344 |
| 5,645,862 | * | 7/1997 | Sable et al. ............................. 425/73 |
| 5,702,652 | * | 12/1997 | Ricciardi et al. ..................... 264/344 |
| 5,804,113 | * | 9/1998 | Blackwell et al. ..................... 425/73 |

FOREIGN PATENT DOCUMENTS 46-37916 * 11/1971 (JP) ........................................ 264/48

* cited by examiner

*Primary Examiner*—Allan R. Kuhns
(74) *Attorney, Agent, or Firm*—Hopgood, Calimafde, Judlowe & Mondolino LLP

(57) ABSTRACT

A system for producing blocks of open-cell, flexible polyurethane foam material and for conditioning each freshly-manufactured block to impart thereto optimal flexible foam properties. The system includes means to pour the flowable constituent of the foam material to be manufactured into a production station at the inlet of a conveyor, the constituents interacting to create on the conveyor a block of open-cell flexible foam material which is then wrapped in a plastic film casing that exposes the leading and trailing end of the block so that the encased block is open ended. The conveyor transports the wrapped block toward the rear end of a gate in a conditioning station having a port therein whose front end is coupled by an air duct to a suction fan. When the exposed leading end of the wrapped block abuts the rear end of the gate, the suction fan draws ambient air into the block through its open trailing end and acts to evacuate from the wrapped block fumes, particulate matter entrained therein and other contaminants generated by an initial exothermic reaction in the block.

5 Claims, 4 Drawing Sheets

METHOD FOR PRODUCING AND CONDITIONING BLOCKS OF FLEXIBLE POLYURETHANE FOAM

RELATED APPLICATION

This application is a division of my application of the same title Ser. No. 09/110,361, filed Jul. 6, 1998, now U.S. Pat. No. 6,022,205.

BACKGROUND OF THE INVENTION

1. Field of Invention

This invention relates generally to the production of blocks of open-cell, flexible polyurethane foam material which can then be sectioned into useable slabs for cushioning and other useful applications, and more particularly to a system for producing these blocks and for conditioning each freshly-manufactured block to impart thereto optimal flexible foam properties.

2. Status of Prior Art

Flexible, open-cell polyurethane foam slabstock is widely used in upholstered furniture, mattresses, carpet underlays and in many other useful applications which require cushioning or shock absorbing properties. It is important therefore that manufactured blocks of this material from which the slabs are sliced have a predetermined density that is uniform throughout the block, that the IFD (indentation force deflection) characteristics of the material be consistent from block to block, and that in general, the properties of the open-cell, flexible foam material satisfy existing criteria for the intended applications.

Various processes for manufacturing large blocks of open-cell, flexible polyurethane foams are well-known. These blocks can be produced on a batch basis in a mold, or continuously in a conveyor-type machine. In this machine, the flowable constituents of the foam are poured into a conveyor inlet station, the constituents interacting to create on the conveyor a large block which is transported to storage or other facilities.

Flexible polyurethane foam is formed by a reaction between a high molecular weight polyol, a diisocyanate and water in the presence of a surfactant. Polyurethane foam commonly contains butylate hydroxy-toluene ("BHT") which is used as an antioxidant in the polyols that are reacted with isocyanates, such as toluene diisocyanate ("TDI"), to form the foam.

This reaction is highly exothermic, reaching a peak, as depicted in a time/temperature curve, typically within about 5 to 30 minutes. Polyurethane foam buns or blocks therefore have to be transferred to a "cure area" where they are carefully placed with an air space around each block until they have cooled. A large area is required for this purpose and the blocks must be stored for a minimum of 10 hours or for a much longer period before they can be restacked or loaded for delivery to a customer.

This process of intermediate storage to ensure adequate cooling of the blocks is inconvenient and costly in terms of space and handling requirements. Moreover, the intermediate storage area contains a large number of blocks of inflammable foam at high temperature, presenting a potential fire hazard. Hence buildings used for such intermediate storage need to be specially constructed to meet fire regulations.

The reason a freshly-manufactured block placed in a storage area in a relatively cool environment assumes a high internal temperature is that the block undergoes two exothermic reactions. The initial reaction takes place within a few minutes after the block is freshly manufactured, the internal temperature of the block then rising to a level of about 180 to 380 degrees Fahrenheit, depending on the water content of the foam, after which it declines. But about an hour and a half later, a second exothermic reaction transpires causing the internal temperature to rise to a level of 300 to 350 degrees Fahrenheit, or even to a point of auto-ignition, depending on the water content of the foam. This high temperature causes discoloration or scorching of the block and in other respects degrades its desirable properties.

Scorching is a result of an oxidation reaction with ambient air which infiltrates the block following expulsion of $CO_2$ produced during the foam-forming reaction. This oxidation reaction which takes place with unreacted isocyanate and the hot foamed polymer is undesirable for several reasons. Even at low levels, such oxidation can produce yellowing of light colored foams, which can render the foam product unacceptable for some commercial uses. If the oxidation reaction is excessive, as evidenced by more than slight yellowing, a deleterious effect on the physical properties of the foam will result. This undesired oxidation reaction can proceed with sufficient intensity to actually cause the foam to ignite and burn.

To overcome these drawbacks, the prior art has long recognized the desirability of a process for the rapid cooling of freshly-manufactured blocks of open-cell, flexible foam polyurethane material.

Thus the Ricciardi et al. U.S. Pat. No. 3,890,414 discloses a forced-air cooling process in which a freshly polymerized foam bun is cooled by passing a cooling gas through the foam mass, a vacuum being applied to one surface of the bun. The rapid cooling process disclosed in this patent reduces the amount of time required to cool foam buns or blocks and produces a product with more uniform properties.

A disadvantage of the Ricciardi process is that the gas exhausted from the foam contains particulate matter generated by the exothermic reaction, as is evidenced by a smoke plume. This smoke which is exhausted into the atmosphere, is not environmentally acceptable.

A later Ricciardi U.S. Pat. No. 5,171,756 discloses a three-stage cooling process in which in the first stage, cool air is drawn through the foam body and then exhausted into the atmosphere. This patent indicates that the exhausted air contains excess water, BHT and a minor proportion of TDI ureas. This air is exhausted to the atmosphere to prevent BHT and TDI ureas from clogging heat exchangers. In stage two, sublimates are withdrawn from the foam with air that is subsequently cooled to condense the sublimates, and is then recirculated through the foam to redeposit the sublimates uniformly throughout the foam. In stage three, additional cool air is drawn through the bun and is vented to the atmosphere to remove moisture and volatile components.

In the patent to Stone U.S. Pat. No. 5,128,379, rapid cooling is effected by passing through the porous polyurethane mass a coolant stream having a water content close to the dew point, the cooling stream being recirculated.

Prior art rapid cooling systems for open-cell, flexible polyurethane foam blocks do not adequately deal with the excessive heat caused by a second exothermic reaction which takes place in the manufactured block. An initial exothermic reaction is experienced within a few minutes after the block is freshly manufactured, but the peak temperature of this reaction is not sufficient to cause scorching of the foam or auto-ignition. But after a relatively long period of two to three hours, reaction products, such as hot fumes produced during the first exothermic reaction react with air drawn into the open-cells of the block to produce a second exothermic reaction having a considerably higher peak temperature. It is this second exothermic reaction that results in scorching of the foam and in the degradation of its useful properties.

With rapid cooling systems of the type heretofore known, the hot fumes and the particulate matter entrained therein generated during the first exothermic reaction are not fully evacuated from the block by cooling air passing through the block. The reason why pockets of these hot fumes, entrained particulate matter and other contaminants remain entrapped within the porous block is that the block is naked and exposed to the atmosphere. The cooling stream forced through the porous block is not distributed throughout all internal regions of the block and does not therefore fully evacuate from the block these contaminants to obviate a second exothermic reaction.

SUMMARY OF INVENTION

In view of the foregoing, the main object of this invention is to provide a system for producing blocks of open-cell, flexible polyurethane foam material and for conditioning each freshly-manufactured block to impart thereto optimal flexible foam properties.

Among the significant features and advantages of the invention are the following:

A. The system acts to fully evacuate from each freshly-manufactured block virtually all of the hot fumes, and entrained particulate matter generated in the first exothermic reaction; thereby obviating the need to store the block for a prolonged cooling period.

B. The system acts to inhibit a second exothermic reaction, thereby preventing scorching of the foam material or auto-ignition, and preventing degradation of the physical properties of the foam material.

C. The system conditions the freshly-manufactured block so that the resultant open-cell polyurethane foam material is of a more uniform density and of high quality, and virtually eliminates formulation changes due to summer and winter changeover and day-to-day atmospheric conditions.

D. The system exhausts the hot fumes and other contaminants generated in the first exothermic reaction to the atmosphere through a wet scrubber whose discharge into the atmosphere is innocuous and environmentally acceptable.

Briefly stated these objects are attained in a system in which the flowable constituents of the foam to be produced are poured into a production station at the inlet of a conveyor. In this station, the constituents interact to create a block of open-cell flexible polyurethane foam material which is wrapped in a plastic film casing that exposes only the leading and trailing ends of the block.

The conveyor transports this freshly-manufactured wrapped block toward the rear end of a gate in a conditioning station having a port therein, the front end of the gate port being coupled by an air duct to a suction fan whose output is discharged into the atmosphere through a wet scrubber or other filtration means.

The rear end of the gate which is engaged by the leading end of the wrapped block is lined with a sheet of synthetic plastic film having an opening therein in registration with the port in the gate.

The rate of conveyance from the production to the conditioning station is such that the freshly-manufactured block arrives at the rear end of the gate in about 5 to 20 minutes after the constituents from which this block is created are poured into the production station, at which time of arrival the first exothermic reaction in the block has reached its peak temperature level and the block is then permeated with hot fumes, particulate matter entrained therein and other contaminants.

When the exposed leading end of the wrapped block is brought into engagement with the sheet-lined rear end of the gate, and the suction fan draws the contaminants from the block through the port, this creates within the block a negative pressure that forces the leading end of the wrapped block against the plastic film sheet lining the rear end of the gate, thereby hermetically sealing the leading end of the block.

As a consequence, the suction fan draws out through the port from the sealed block the hot fumes and other contaminants permeating all internal regions of the block, and the fan feeds this exhaust to the atmosphere through filtration means that extract the contaminants from the exhaust.

Because of the evacuation from the block of substantially all of the contaminants generated in the first exothermic reaction, a second exothermic reaction is inhibited and the physical properties of the block are stabilized to render the flexible foam material suitable for the practical applications for which the material is intended.

BRIEF DESCRIPTION OF DRAWINGS

For a better understanding of the invention as well as other objects and further features thereof, reference is made to the following detailed description to be read in conjunction with the accompanying drawings, wherein.

DESCRIPTION OF INVENTION

The Basic System

In a system in accordance with the invention for producing and conditioning a block of open-cell, flexible polyurethane foam material, a known formulation which includes a polyol and a diisocyanate may be used to create the block. Thus the foam may be produced by reacting a polyether polyol with toluene diisocyanate and water in the presence of a surfactant.

Examples of suitable polyols are ARCOL F 3020 polyether triol produced by Arco Chemical Company, and VORANOL 3010 polyol, produced by Dow Chemical Company.

Figure 1:
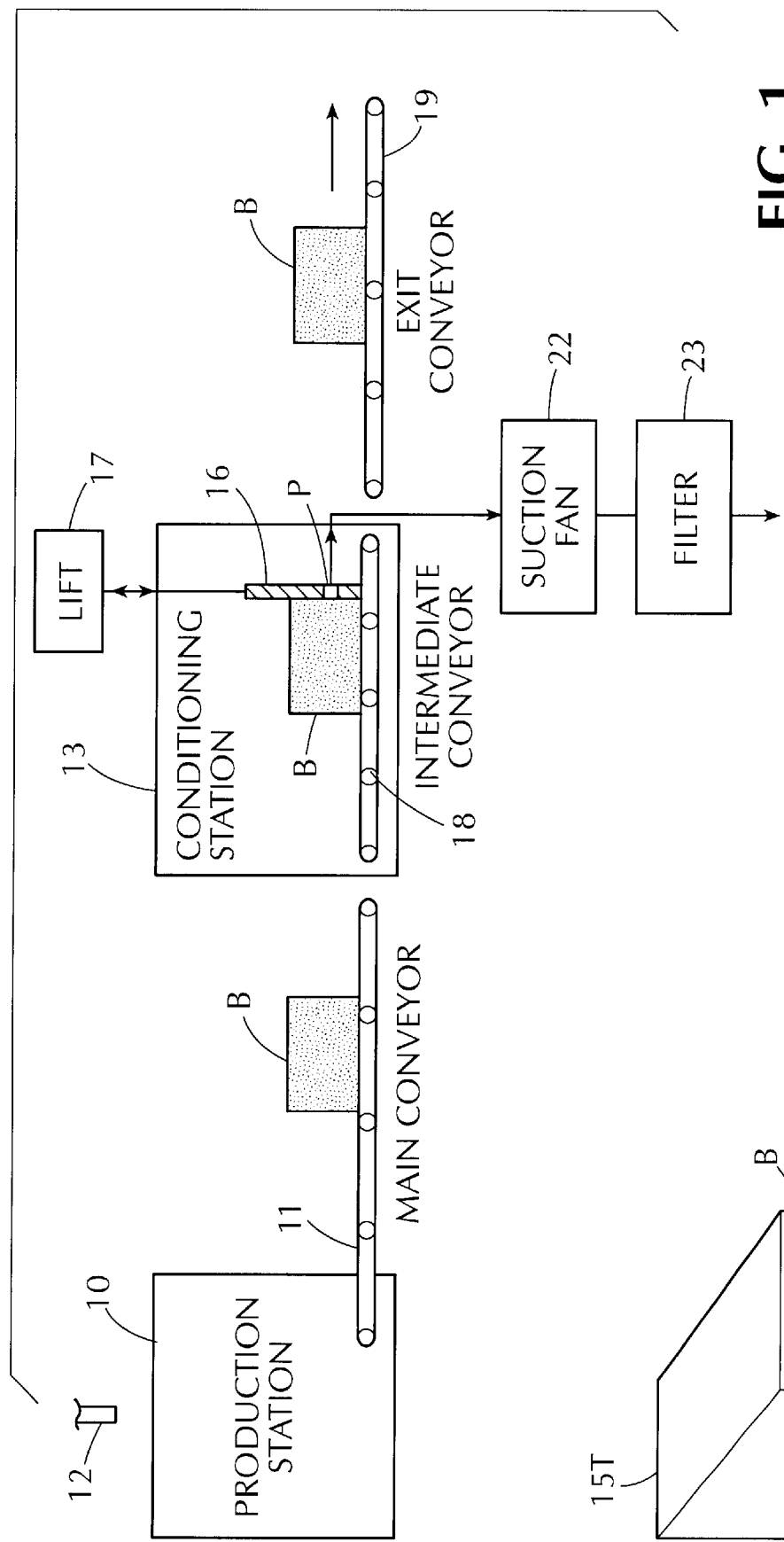
FIG. 1 is a schematic illustration of a system in accordance with the invention for producing and conditioning a block of open-cell, flexible polyurethane foam material.

As shown schematically in FIG. 1, a block B of open-cell, flexible polyurethane foam material is produced in a production station 10 installed at the inlet of a main conveyor 11. The flowable chemical constituents of the formulation are poured by a nozzle 12 into station 10. The constituents then interact to create a large block B of open-cell, flexible polyurethane foam material at the inlet of conveyor 11, which block is transported by the conveyor to a conditioning station 13.

Figure 2:
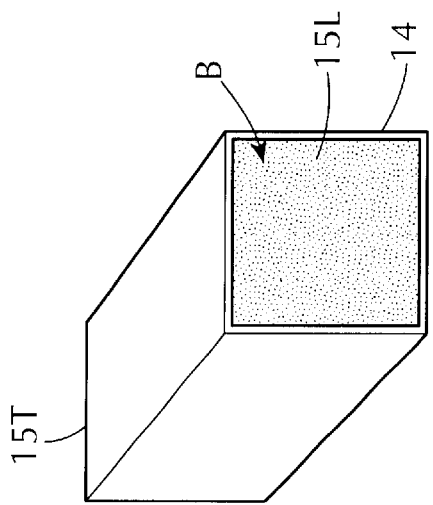
FIG. 2 is a perspective view of a wrapped block of this material.

In production station 10, the flowable constituents from which the block is created are laid down on a sheet of synthetic plastic film, such as polyvinyl chloride or polyehtylene. Also applied to the sides of the block and to the top surface thereof are sheets of plastic film material which are extracted and cut from respective rolls. Block B, as shown, in FIG. 2 is therefore wrapped in a thin plastic film casing 14 which forms a sleeve to encase the block except for its leading end 15L and its trailing end 15T which remain exposed. Thus wrapping 14 is effectively an open-ended duct, the wrapped block of polyurethane being like an encased block of cheese whose front and rear ends have been sliced off.

When wrapped block B enters conditioning station 13, it is carried by an intermediate conveyor 18 toward a gate 16. Gate 16 is raised and lowered by means of a hydraulic or air lift mechanism 17, or by a similar mechanism adapted to raise the gate after the block B is conditioned so that the block can be transferred from intermediate conveyor 18 to an exit conveyor 19.

Figure 5:
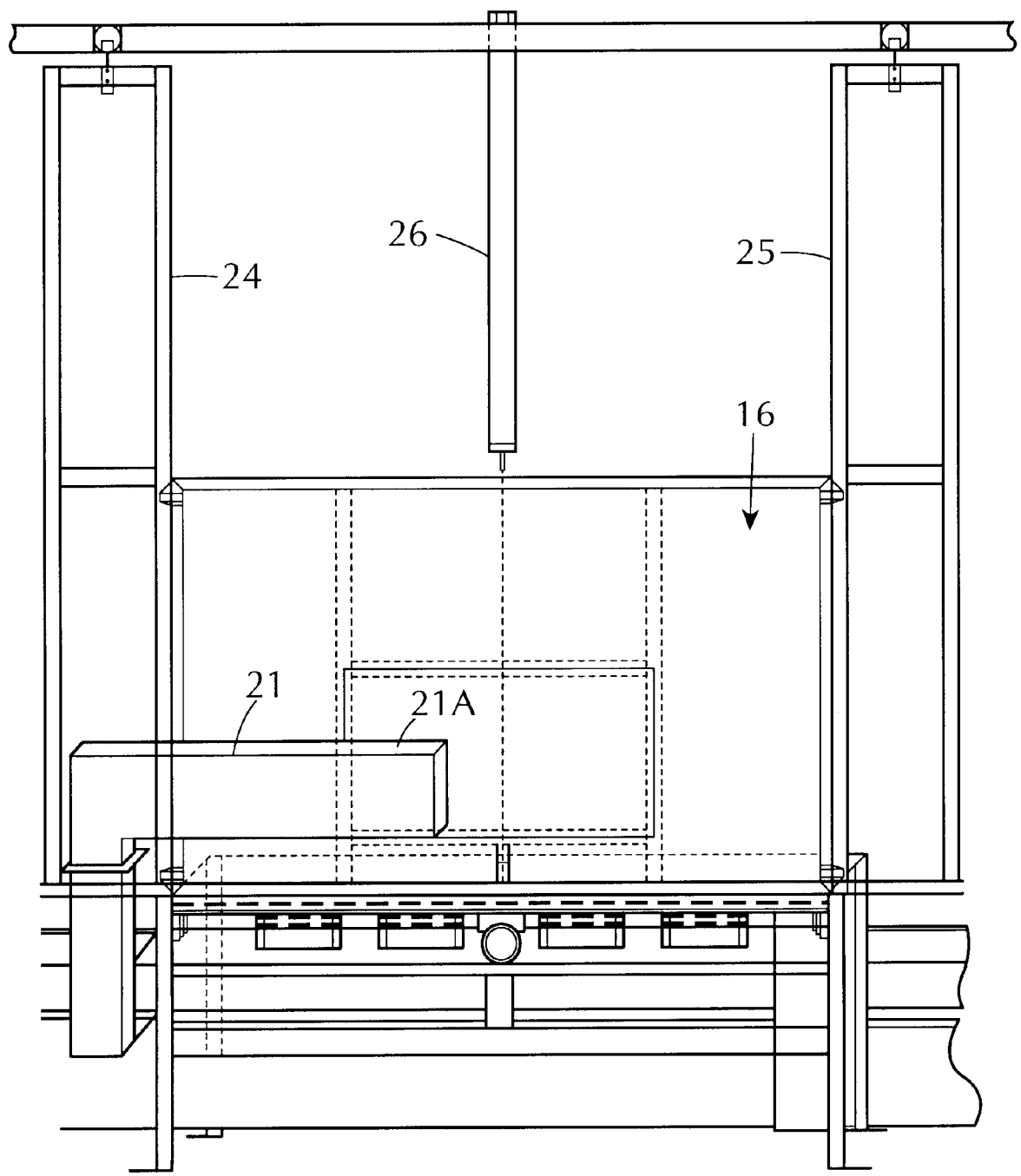
FIG. 5 illustrates the hydraulic mechanism for raising and lowering the gate.
Figure 6:
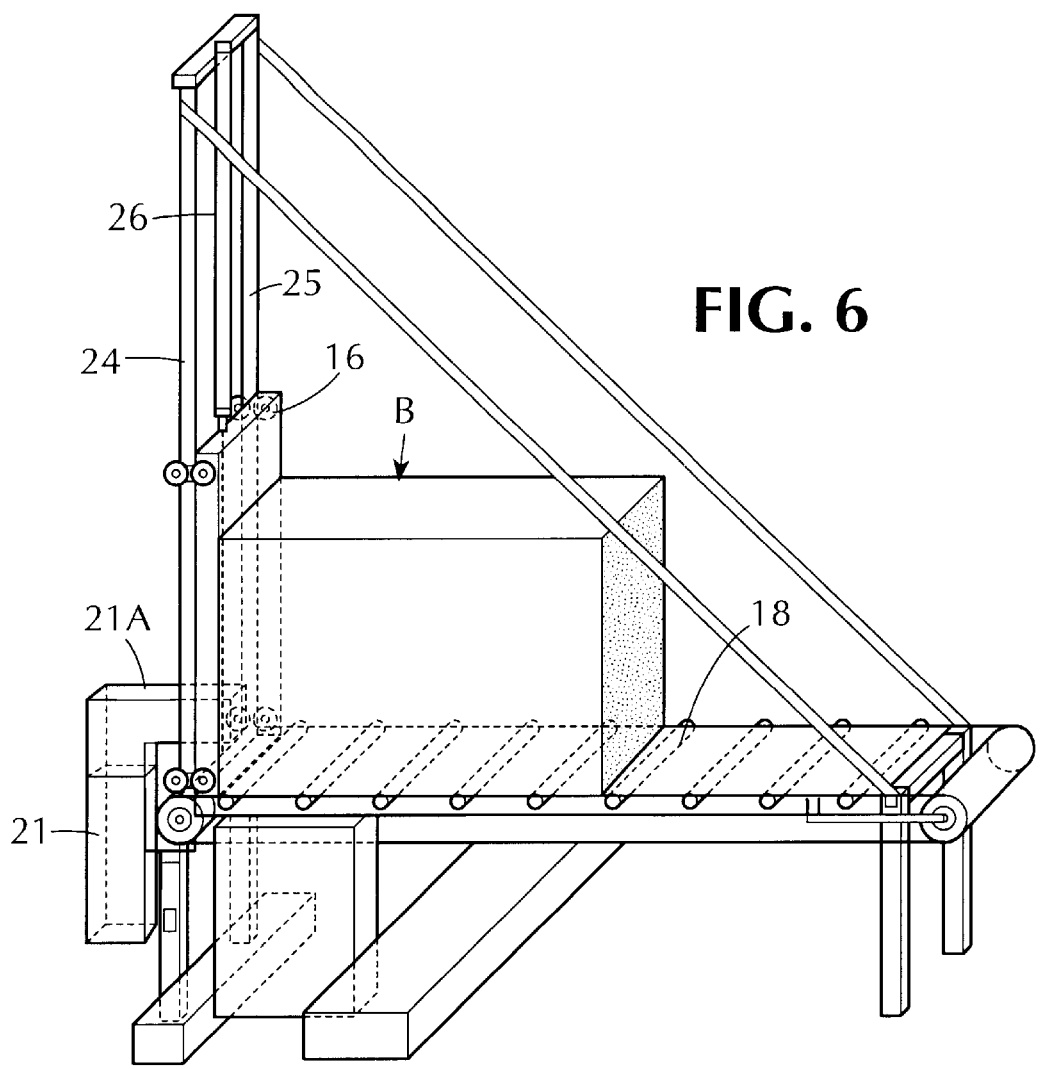
FIG. 6 illustrates, in a perspective view, the operative relationship of the gate to the block in the conditioning station.

As shown in FIGS. 5 and 6, gate 16 is mounted between and rides on vertical tracks 24 and 25, and is raised and lowered by means of a hydraulic cylinder 26.

Figure 3:
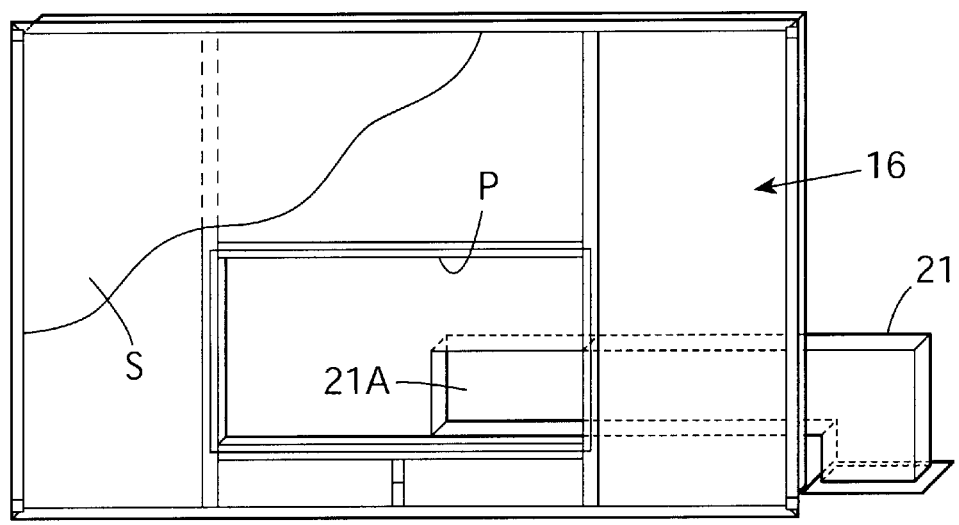
FIG. 3 is an elevational view of the gate included in the conditioning station of the system, as seen from the rear end of the gate.
Figure 4:
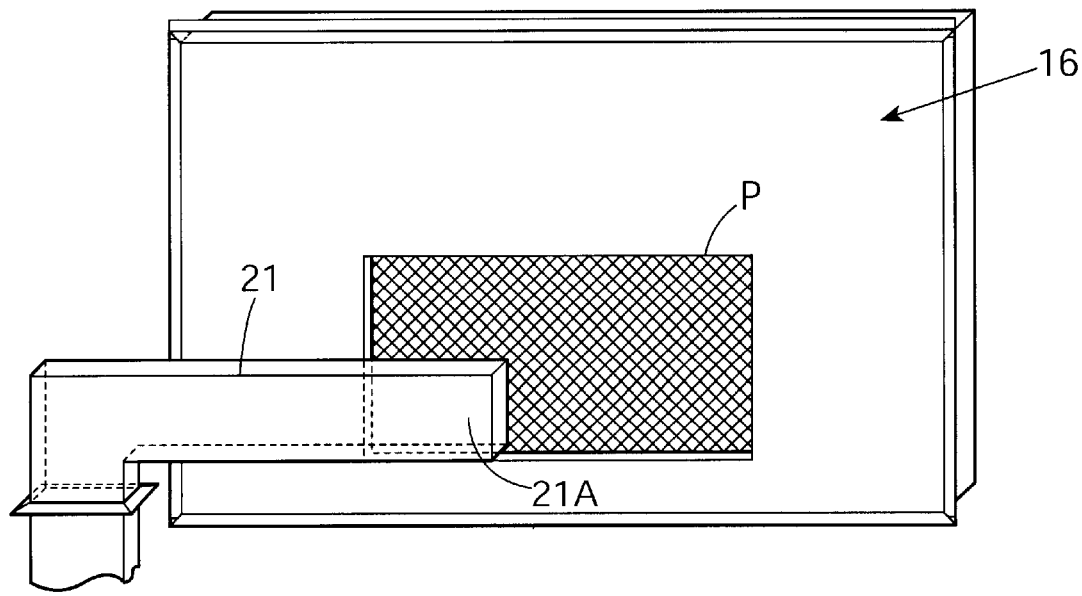
FIG. 4 is an elevational view of the same gate as seen from its front end.

Gate 16 is provided with a port P whose position is such that it lies within the area of the leading end 15 of the wrapped block B when this block abuts the rear end of the gate. Port P is coupled to the inlet 21A of an air duct 21 at the front end of the gate, as shown in FIGS. 3 and 4, which duct leads to a suction fan 22. The exhaust of suction fan 22 is discharged through a suitable filter 23 to the atmosphere.

Suction fan 22 coupled to port P in gate 16 produces a negative pressure in block B. This acts to draw ambient air into the wrapped block through its trailing end 15T, the sucked in air flowing through the porous polyurethane block to pick up contaminants therein which exit from the block through port P.

As shown in FIG. 3, the rear end of gate 16 is covered by a sheet S which is maintained in place by a rectangular frame. Sheet S is formed of synthetic plastic film material which has an opening therein which registers with inlet 21A of the duct 21. When the leading end of the wrapped block abuts the rear end of gate 16, the negative pressure created in the block by the suction force causes the leading end of the block to press against sheet S which then hermetically seals this end except for the inlet to the duct.

Since suction fan 22 acts to draw contaminants from the interior of the wrapped block B, and these contaminants will pollute the atmosphere if not filtered out, a preferred filter for the purpose is the wet electrostatic scrubber disclosed in my copending application Ser. No. 08/815,717, filed Mar. 12, 1997, entitled "Wet Gas Stripper" whose entire disclosure is incorporated herein by reference.

Main conveyor 11 is formed by an endless belt supported by a series of rollers, the conveyor being motor driven to carry the wrapped block from Production Station 10 to Conditioning Station 13 so that block B reaches gate 16 at a time that depends on the length of the conveyor and its speed of movement.

The conveyor arrangement is such that the leading end of block B does not reach the rear end of the gait until a predetermined amount of time has elapsed from the initial pouring of the constituents into production station 10 by nozzle 12. The preferred time for this purpose lies in a range of about five to one hundred and twenty minutes, depending on the formulation used to create the block. By this time of arrival, the block has experienced an initial exothermic reaction in which the internal temperature of the block has peaked, and the block is now permeated with hot fumes having particulate matter entrained therein and other contaminants resulting from this exothermic reaction.

Operation of System

By drawing cool air through the block to evacuate therefrom the hot fumes, the particulate matter entrained therein and other contaminants, block B is not only cooled, but a second and more intense exothermic reaction is inhibited. A second exothermic reaction cannot take place without reacting with air, the hot fumes and other contaminants given off by the first exothermic reaction. Because there is no second exothermic reaction, no discoloration of the foam material in the block or scorching thereof takes place, nor are the physical properties of the foam material in any way degraded.

It is important to note that because block B is encased so that only its leading and trailing ends are exposed, when the leading end is sealed by the rear end of gate 16, then the only entry for ambient air into the block is through the open trailing end of the block. When therefore a suction force is applied through port P to evacuate the fumes and other contaminants from the open cells of the foam material, the suction force operates within the confines of the casing and clears out almost all contaminants permeating the foam, leaving virtually nothing behind that would give rise to a second exothermic reaction.

As a consequence, when the freshly-manufactured block B is cooled and conditioned in conditioning station 13, it has a substantially uniform density which is high, medium or low, depending on the formulation, and it has IDF and other physical properties which are optimal for the intended application for the foam.

When gate 16 is raised and the conditioned block B is transferred to exit conveyor 19, the block is fully cured and stabilized, and there is no need to place the block in a storage facility to be cooled, for now the block is in condition to be sectioned into slabs or otherwise processed for practical applications.

The simplified schematic arrangement for producing and conditioning a block of open-cell flexible polyurethane foam shown in FIG. 1 does not take advantage of the ability of the production station 10 to manufacture blocks at a high rate, for its conditioning station 13 can only condition one block at a time. In a mass production arrangement, use can be made of an array of conditioning stations 13 with a train of blocks B yielded by a single production station 10 being conveyed successively to the conditioning stations in the array.

For this purpose, the main conveyor which transports the train of blocks emerging from the production station must transfer these blocks at right angles to a transition conveyor associating several of the conditioning stations in the array, the blocks carried by the transition conveyor being transferred to the respective conditioning stations.

To effect transfer from one conveyor in the conveyor network to another in the network at right angles thereto, use may be made of a pop-up conveyor that fits between rollers of the main conveyor and lifts the block off the main conveyor and transports it at a ninety degree angle to the transition conveyor.

The invention however is not limited to continuously-produced blocks of open-cell flexible foam, for the block fed into the conditioning station may be a block produced in a mold.

Advantage of System

In the commercial production of open-cell, flexible polyurethane foam, the chemicals from which the block is created are poured into a trough or various other means, and internally-generated gases then cause the foam to rise vertically to create the block.

Figure 7:
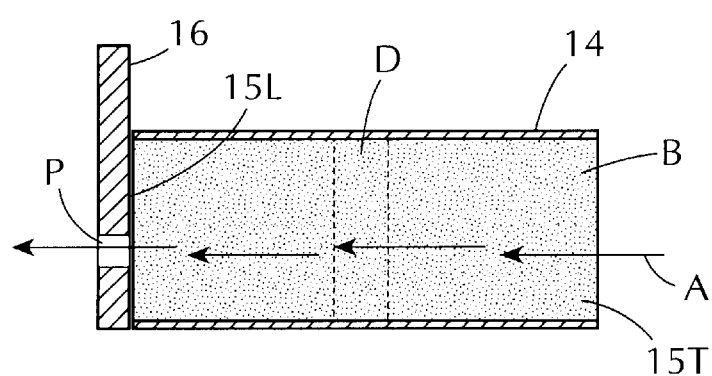
FIG. 7 illustrates the interior of the polyurethane block and the manner in which cooling air is drawn through this interior.

For various reasons, during commercial production the normal flow of some chemicals being fed into the trough may be momentarily reduced or interrupted. As a consequence, the density of the foam is not uniform throughout the block; for the block, as shown in FIG. 7, may include a crossectional region D of greater density than other regions of the block. Hence the porosity of the open-cell foam in region D is such as to offer a greater impedance to the flow of cooling air than these other regions of the block.

When ambient air is drawn into a freshly-manufactured polyurethane block to effect rapid cooling thereof in the manner disclosed in the prior art, such as in the Ricciardi U.S. Pat. No. 3,890,414 the bock is then naked and fully exposed to ambient air.

When therefore a suction force is applied to the front end of the block, ambient air is then drawn into the block through its sides and top surface as well as through the rear end of the block. But since the denser region D is somewhat less porous than other regions of the block, cooling air drawn into the block will seek flow paths offering less resistance to flow and will therefore by pass the denser region D.

Because the cooling air by passes region D, contaminants in this region resulting from a first exothermic reaction are not evacuated therefrom, and the block will not be fully decontaminated to obviate a second exothermic reaction that may have distinctive effects.

A significant advantage of a system in accordance with the invention over known rapid cooling systems is that the freshly-manufactured polyurethane block coming out of the production station is so encased that it is in effect an open-ended duct in which cooling air entering through the trailing end of the block can exit only through the leading end thereof.

Hence, as shown in FIG. 7, when the leading end 15L of the encased block B abuts gate 16 and a suction force is applied to port P in the gate, ambient air is then sucked into the block only through the open trailing end 15T.

The cooling air therefore passes through the polyurethane block in a path confined by its duct-like wrapping 14. The cooling air necessarily passes through region D of higher density, even though this region offers greater impedance to flow than the other regions of the polyurethane block.

In this way, imperfections in the polyurethane block introduced in the course of its production do not interfere with the ability of the system to evacuate virtually all contaminants contained in the block as a result of the first exothermic reaction, thereby obviating an undesirable second exothermic reaction.

While there has been shown preferred embodiment of a system in accordance with the invention, it will be understood that many changes may be made therein without departing from the spirit of the invention.

I claim:

1. A method of conditioning a freshly manufactured block of open-cell, flexible polyurethene foam material after it has experienced an exothermic reaction permeating the block with hot fumes and other contaminants, said method comprising the steps of:

A. prior to the exothermic reaction, wrapping the block in a casing which seals the block except for its leading end and its trailing end which remain exposed;

B. after the exothermic reaction, closing the exposed leading end of the wrapped block with a gate having a port therein; and C. applying a suction force to the block through the port to evacuate said contaminants from the block and thereby stabilize the physical properties of the foam.

2. A method as set forth in claim 1, in which the gate is lined with a sheet of plastic film, and the suction force produces in the block a negative pressure forcing the leading end of the block against the sheet to hermetically seal the leading end.

3. A method as set forth in claim 1, in which the block is produced at a production station and is conveyed therefrom to a conditioning station provided with said gate.

4. A method as set forth in claim 3, in which constituents of the foam material are poured into said production station and laid down on a conveyer belt in which the block is formed and conveyed to said conditioning station.

5. A method as set forth in claim 4, in which the block is conveyed in the belt to reach the gate at the conditioning station within a period of time in a range of about five to one hundred twenty minutes running from the time said constituents which produce the block are poured at the production station.

\* \* \* \* \*